United States Patent [19]
Perez

[11] 3,881,406
[45] May 6, 1975

[54] APPARATUS FOR PEELING FRUIT OR VEGETABLES

[76] Inventor: Artemio R. Perez, 14540 S.W. 284th St., Leisure City, Fla. 33030

[22] Filed: Nov. 28, 1973

[21] Appl. No.: 419,655

[52] U.S. Cl. .............. 99/594; 99/541; 99/594; 99/597; 99/598; 99/599
[51] Int. Cl. .............. A47j 17/04; A47j 43/28
[58] Field of Search ............ 99/598, 597, 599, 594, 99/541; 269/157, 210, 212, 215

[56] References Cited
UNITED STATES PATENTS

| | | | |
|---|---|---|---|
| 315,158 | 4/1885 | Oaks | 99/598 |
| 1,008,555 | 11/1911 | Mower | 99/598 |
| 2,361,241 | 10/1944 | Rogers | 99/598 |

Primary Examiner—Henry K. Artis
Assistant Examiner—James E. Bryant, III
Attorney, Agent, or Firm—J. Gibson Semmes

[57] ABSTRACT

An apparatus for peeling fruit or vegetables in which the fruit or vegetable is rotatably held in contact with a paring blade which moves along its surface in synchronization with the rotation of the fruit, thereby removing the fruit peel in a continuous strip.

2 Claims, 2 Drawing Figures

APPARATUS FOR PEELING FRUIT OR VEGETABLES

FIELD OF THE INVENTION

This invention relates to the art of mechanical devices for peeling fruits and vegetables, particularly those in which the fruit or vegetable is rotatably secured while a paring blade moves along its outer surface to remove the peel.

DESCRIPTION OF THE PRIOR ART

Numerous attempts have been made in the past to perfect paring machines for fruits and vegetables. Whittemore disclosed an apple paring device in U.S. Pat. No. 16,417 in which a rotating apple is moved past a relatively stable paring blade to effect peel removal. Hoff showed in U.S. Pat. No. 262,896 that the paring blade could be caused to move along the surface of the rotating fruit by a worm gear driven simultaneously with the fruit. Tripp, et al. showed in U.S. Pat. No. 572,689 a paring machine comprising complex linkages for moving the paring knife in and out of engagement; and in U.S. Pat. No. 669,714, a complex machine including means for rapid return of all components to their starting position, once the fruit has been peeled.

Kools conceived a device shown in U.S. Pat. No. 1,579,771, including complex mechanisms for articulating the movement of the paring blade and removing unpeeled end pieces. Duncan showed in U.S. Pat. Nos. 1,820,351 and 1,831,786 a fruit peeler having an intricate shaft and gear driven cutter mechanism and a complex fruit holder which completely pierced the body of the fruit. Applicant's invention comprises a novel and ingenuous peeler, especially suited for citrus fruits, which is automatic in operation; clean and suitable for home use and simply adapted for peel removal without damaging the fruit or vegetable.

SUMMARY OF THE INVENTION

The invention relates to an apparatus for peeling fruits or vegetables which comprises a frame; means rotatably attached to the frame for releasably holding a piece of fruit or a vegetable for rotation about an axis thereof; a shaft having a worm gear segment mounted for rotation in the frame, the gear having spaces between the threads thereof; means attached to the frame for selectively rotating the worm gear shaft and means for holding the piece of fruit or vegetable about the axis thereof; a guide bar mounted for rotation in the frame; a paring blade mounting rod; means for slidably attaching the mounting rod to the guide bar whereby the mounting rod extends laterally thereof; a paring blade mounted for selective rotation about and movement along the mounting rod; a worm gear engaging arm pivotally attached to the means for attaching the mounting rod, said arm having edge portions for engaging the spaces between the threads of the worm gear segment; and means for resiliently retaining the edge portions of the engaging arm in the spaces between the threads of the worm gear segment.

DESCRIPTION OF THE PREFERRED EMBODIMENT

Figure 1:
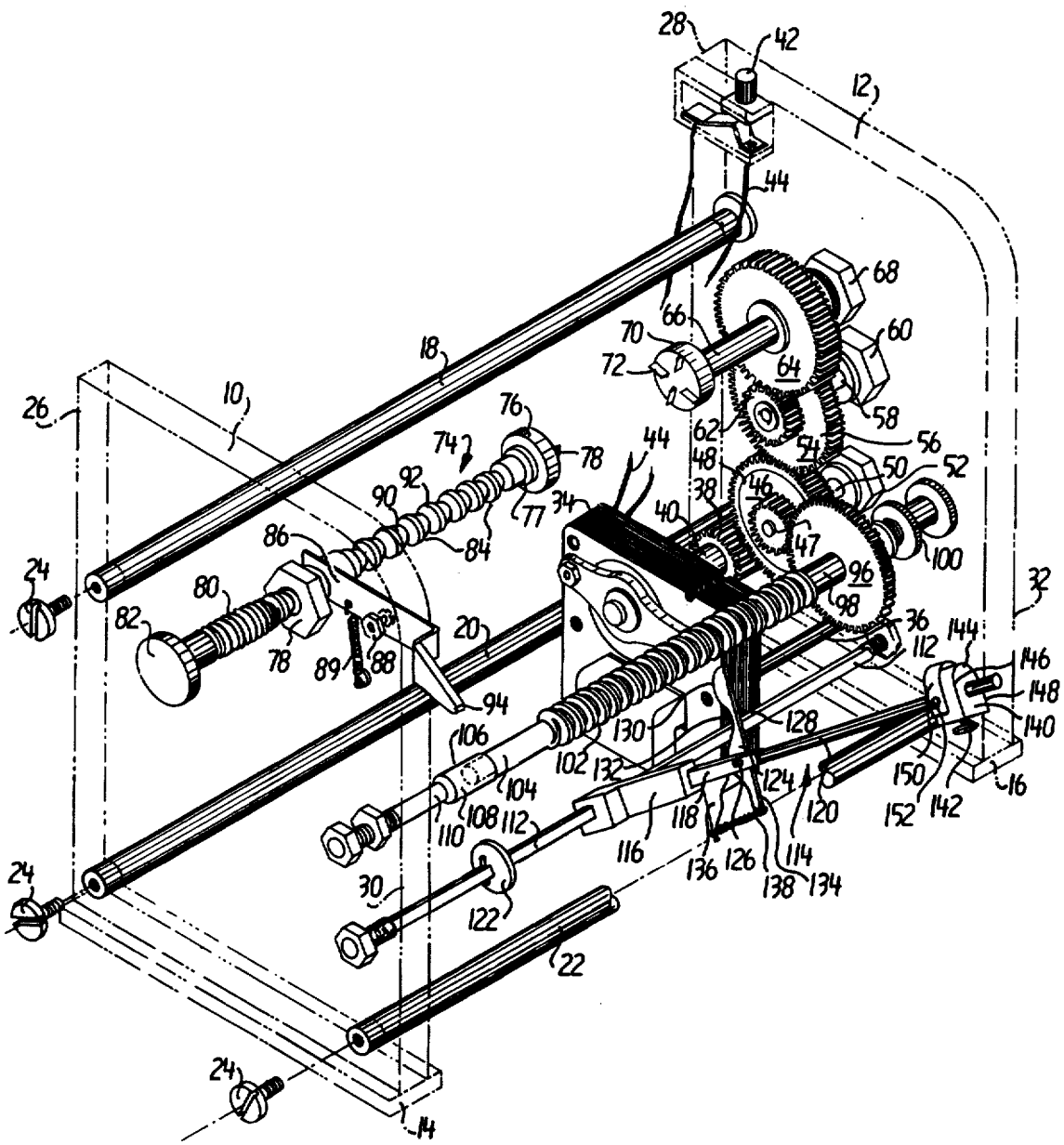
FIG. 1 shows an exploded isometric view, partially in section and partially in phantom, of the invention.

There follows a detailed description of the preferred embodiment of the invention, reference being made to the drawings in which like reference numerals identify like elements of structure in each of the figures.

The components of the invention are shown in partially exploded form in FIG. 1. Frame walls 10 and 12, shown in phantom, are of essentially rectangular configuration and act as support and bearing members for the other elements of the invention. Pediments 14 and 16 are attached to frame walls 10 and 12 to provide greater support surface for the apparatus in use. The frame walls and pediments may be manufactured of aluminum of other lightweight material of suitable strength plastics. Extending between the frame walls are three frame rods 18, 20 and 22 which are secured to the frame walls by screws 24 or other suitable structure. Rods 18 and 20 are spaced one above the other between the rear vertical edges 26 and 28 of the frame walls, to define the rear portion of the frame. Rod 22 is located between the lower portions of the front vertical edges 30 and 32 of the frame walls, to define the front portion of the frame. The upper portion of the front part of the frame has no frame rod, thereby permitting easy access to the working parts of the invention.

Electric motor 34 is mounted to frame wall 12 on mounting posts 36, one of which is shown, so that the motor is spaced from the frame wall 12 a distance suitable to accommodate drive gear 38, mounted on output shaft 40 of motor 34. The motor is of conventional design used in appliances such as electric can openers and knife sharpeners. Obviously, the motor could be mounted on the other side of frame wall 12 to drive a gear through an aperture in the frame wall; however, this configuration is preferred for compactness and neatness of appearance. A switch 42 is mounted on frame wall 12 above motor 34, to permit easy access, and is connected via conductors 44 to motor 34 and a suitable source of power, not shown.

Drive gear 38 meshes with the larger gear 48 of compound idler gear 46, mounted on shaft 50 which is rotatably mounted in bearing 52, attached to frame wall 12. Thus, compound idler gear 46 operates at reduced speed relative to drive gear 38. Gear 48 meshes with the larger gear 56 of compound idler gear 54, mounted on shaft 58 which is rotatably mounted in bearing 60, attached to frame wall 12. Thus, compound idler gear 54 operates at reduced speed relative to drive gear 38. The smaller gear 62 of compound idler gear 54 meshes with fruit or vegetable rotation gear 64, mounted on shaft 66 which is rotatably mounted in bearing 68, attached to frame wall 12. Thus, fruit or vegetable rotation gear 64 operates at reduced speed relative to compound idler gear 54. Shaft 66 extends inwardly of the frame and includes on its inner end a fruit holding bit 70, of cylindrical configuration. The interiormost surface of the bit 70 includes four holding blades 72 which extend inwardly from the surface a distance sufficient to hold the fruit or vegetable without damaging it significantly except at the surface of the peel.

Mounted to frame wall 10 on an axis common to shaft 66 and bit 70 is a spring biased plunger rod 74, having a bit 76 and blades 78 identical to and juxtaposed to bit 70 and blades 72, bit 76 being rotatably attached to the interior end 77 of plunger rod 74. Plunger rod 74 extends through a bore in screw fitting 78, attached to frame wall 10. Bearing against the outer surface of fitting 78 is spring 80 which is maintained in a compressed condition between fitting 78 and manual adjustment knob 82. The portion of plunger rod 74 located interiorly of frame wall 10 includes a plurality of axially spaced stop elements 84, which are used to restrain the plunger rod in a partially withdrawn position while a fresh fruit or vegetable is inserted or a peeled fruit or vegetable removed. Plunger rod restraining arm 86 is pivoted for rotation about pivot 88 and biased by spring 89 into contact with stop elements 84 to prevent plunger rod 74 from being withdrawn from the interior of the frame under the action of spring 80. Arm 86 includes an upwardly opening cut out (not shown) which fits between stop elements 84 so that plunger rod 74 may be manually pushed inwardly of the frame against the force of spring 80, whereby the conical portions 90 of stop elements 84 cause arm 86 to ratchet from stop element to stop element. When the plunger rod begins to be withdrawn from the frame under the action of spring 80, however, arm 86 engages with the radially extending cylindrical portions 92 of stop elements 84 to prevent further withdrawal. Complete withdrawal of plunger rod 74 is achieved by manually depressing extension 94 of arm 86.

The smaller gear 47 of compound idler gear 46 meshes with paring blade drive gear 96, mounted on shaft 98 which is rotatably mounted in bearing 100, attached to frame wall 12. Thus, paring blade drive gear 96 rotates at reduced speed relative to compound idler gear 46. By suitable choice of gear sizes, the rates of speed of the fruit or vegetable rotation gear and paring blade drive gear may be adjusted to suit a particular application; however, in practice, it has been found adequate if they operate at similar speeds. The gears may be manufactured of metal if desired; however, commercially available plastic gearing has proven suitable. Shaft 98 extends inwardly of the frame and carries a worm gear segment 102, which translates the paring blade assembly, as will be described. End 104 of shaft 98 includes a section of reduced diameter 106 which is journaled for rotation in bushing 108. Bushing 108 is attached to rod 110, attached to frame wall 10, as shown.

Extending between frame walls 10 and 12 and pivotally attached thereto is guide bar 112 for paring blade assembly 114. Slidably mounted on guide bar 112 is paring blade assembly 114 which comprises a base portion 116, worm gear follower 118 and paring blade mounting rod 120. Guide bar 112 is of rectangular cross section and base portion 116 includes a corresponding rectangular bore therethrough to permit base portion 116 to slide along guide bar 112. Rigidly attached to guide bar 112 is stop washer 122 which limits the leftward movement of the paring blade assembly.

Worm gear follower 118 comprises an essentially flat worm gear engaging arm 124 pivotally attached to the paring blade assembly 114 at 126. Arm 124 includes an essentially straight upper edge 128; a downwardly curving leading edge 130 for initial, cam-like engagement with the worm gezr 102; an upwardly curving cutaway portion 132 for translating engagement between the threads of the worm gear 102; and, on the opposite side of pivot 126 from the previous elements, a bias spring arm 134. Located below spring arm 134 is arm 136 which supports bias spring assembly 138 between arms 134 and 136.

Paring blade mounting rod 120 extends upwardly from worm gear follower 118 and is of circular cross-section. Rotatably and slidably attached to the mounting rod 120 is paring blade holder 140 which may be fixed in a desired position by setscrew 142. Holder 140 has an essentially cylindrical leading edge 144 and planar sides 146 and 148. Paring blade 150 is a flexible strip of suitable material, preferably stainless steel, which is curved around and spaced from leading edge 144 and attached to sides 146 and 148 using suitable fasteners such as screws 152. The spacing of blade 150 from leading edge 144 may be adjusted as desired to provide a greater or lesser thickness of cut into the peel of the fruit or vegetable. Depending on the direction of rotation of the motor 34 and the hand of worm gear 102, the paring blade 150 may be caused to cut on either its upper or lower edge.

Figure 2:
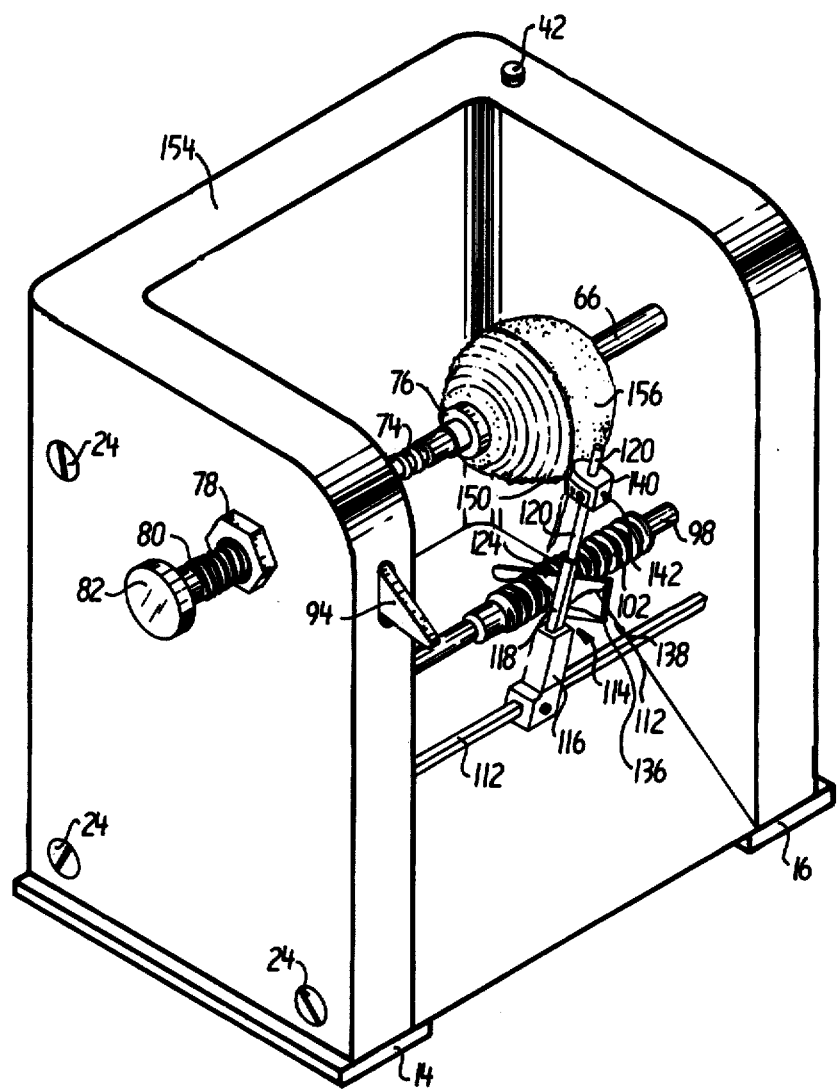
FIG. 2 shows an isometric view of the assembled invention, as it appears in use.

FIG. 2 shows the invention in its fully assembled condition. A molded plastic or metal cover 154 encloses the majority of the moving parts of the invention, as shown, leaving exposed plunger rod 74 and knob 82, shaft 66 and fruit holding bit 70, shaft 98 and worm gear 102, guide bar 112 and paring blade assembly 114 and on-off switch 142. Cover 154 provides a neat and attractive appearance and protects the gear train, motor and switch assembly from contact by corrosive fruit or vegetable juices or peel oils.

In use, a piece of fruit or vegetable 156 is placed in contact with the holding blades 72 of holding bit 70 and the holding blades 78 of holding bit 76 are forced into the axially opposite end of the fruit or vegetable by pressing plunger rod 74 inwardly, the appropriate number of stops until the fruit or vegetable is securely held. Paring blade assembly 114 is then swung inwardly so that leading edge 130 rides up and over the worm gear 102 and cutaway portion 132 drops into place between the threads of the worm gear, under the retaining force of spring assembly 138 acting on arm 134. In its innermost position, blade 150 engages the fruit or vegetable near holding bit 76 once the blade has been manually inserted into the peel or rind. Switch 142 is then actuated so that the fruit, illustrated as an orange, begins to rotate causing the paring blade 150 to remove a smooth spiral of peel or rind. As the paring blade assembly moves along the axis of the fruit or vegetable under the driving force of worm gear 102, the assembly swings outwardly due to the curvature of the fruit or vegetable; however, due to the shape of edge 130 and cutaway portion 132 and to the retaining force applied by spring assembly 138, the blade 150 remains in contact with the fruit or vegetable and arm 124 remains drivingly engaged with worm gear 102. When the peel has been completely removed, except for small areas obscured by holding bits 70 and 76, the motor 34 is shut off via switch 42. Paring blade assembly 114 is swung outwardly. Extension 94 of arm 86 is then depressed, permitting plunger 74 to retract under the effect of spring 80 and freeing the peeled fruit or vegetable for subsequent use.

Having described my invention in such a manner as to enable one of ordinary skill in the art to make and use it, I claim:

1. An apparatus for peeling fruit and the like comprising:

A. a frame and an encompassing cover;

B. means operatively mounted in said frame for rotatably and releasably holding a piece of fruit for rotation about an axis thereof;

C. a rotatably mounted shaft having a worm gear segment thereon and mounted for rotation in said frame, the gearing of said segment having spaced threads;

D. drive means attached to said frame operable for simultaneously rotating the worm gear shaft and the fruit holding means including;
   i. a drive motor; and
   ii. a gear train interconnecting an output shaft of said motor and said shaft and said fruit holding means;

E. a guide bar pivotally mounted in said frame;

F. a paring blade mounting rod;

G. means slidably attaching said mounting rod on said guide bar with the mounting rod extending laterally thereof;

H. a curved closed nose flexible paring blade mounted on said blade mounting rod, said blade being arcuately swingable upon pivoting movement of said guide bar, and translationally movable upon sliding of said mounting rod, the curved nose portion being adjustably engageable with the fruit for depth of cutting into the peel thereof;

I. a worm gear engaging arm pivotally attached to said mounting rod, said arm having a compound curvilinearly shaped edge engaging the spaces between said worm gear segment threads and operable to translate said paring blade mounting rod and blade thereon upon rotation of said worm gear and said fruit holding means;

J. spring means adjustably resiliently retaining said shaped edge of said engaging arm in said spaces between the threads of said worm gear segment; and K. said compound curvilinearly shaped edge being resiliently retained in driving engagement with said worm gear segment threads by the shape thereof as said paring blades moves along the axis of a fruit being peeled and swings outwardly and inwardly during resiliently engaged peeling contact of said paring blade due to curvature of the fruit.

2. The apparatus of claim 1, wherein the means for releasably holding a piece of fruit comprises:

B1. a second shaft mounted for rotation in the frame and including a first fruit or vetgetable holding bit on an end thereof;

B2. a third shaft mounted for axial translation in the frame on an axis common to the second and including a second fruit or vegetable holding bit rotatably mounted on an end thereof in juxtaposition to the first fruit or vegetable holding bit;

B3. spring means for biasing the third shaft and second fruit or vegetable holding bit axially away from the first bit; and B4. selectively actuable means for restraining the third shaft against the action of the spring means.

* * * * *